Patented Sept. 1, 1925.

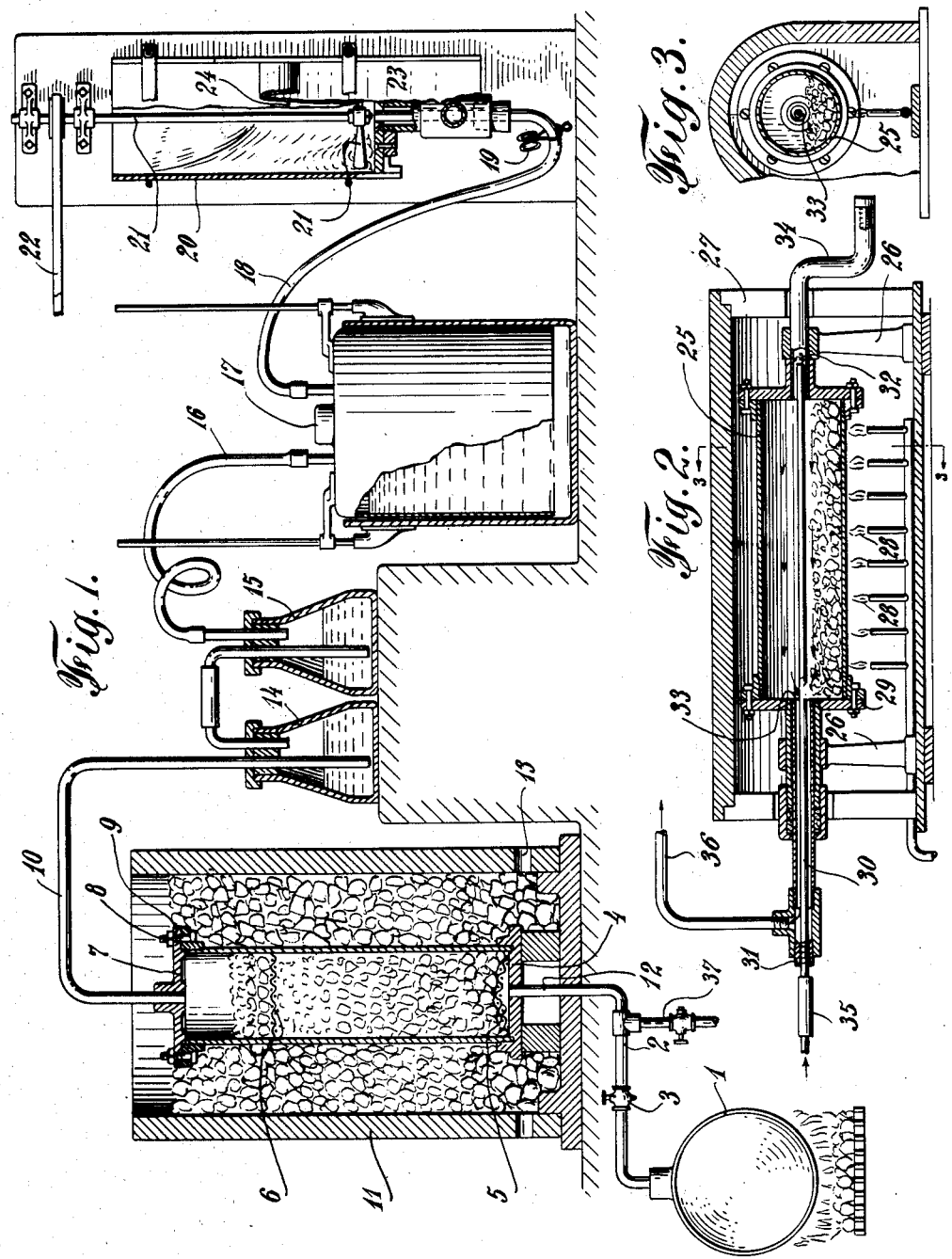

1,551,588

UNITED STATES PATENT OFFICE.

HAROLD HARDY SMITH, OF WOOLWICH, SYDNEY, AUSTRALIA, ASSIGNOR TO MINERALS SEPARATION NORTH AMERICAN CORPORATION, A CORPORATION OF MARYLAND.

ORE CONCENTRATION.

Application filed July 26, 1920. Serial No. 399,040.

*To all whom it may concern:*

Be it known that I, HAROLD HARDY SMITH, a subject of the King of Great Britain, and a resident of Woolwich, Sydney, Australia, have invented certain new and useful Improvements in Ore Concentration, of which the following is a specification.

This invention relates to ore concentration processes, and is herein disclosed as applied to the froth-flotation concentration of oxidized ores and more especially as applied to such concentration of an oxidized copper ore.

I have discovered that an oxidized ore may be treated by a sulphide in the presence of a suitable modifying agent in such a way as to enable the values to be readily concentrated by froth flotation. Hydrogen sulphide has been found to be a satisfactory sulphide for this purpose, and a satisfactory modifying agent may be readily generated in admixture with the hydrogen sulphide by passing steam, or steam and air, at the proper temperature, over or through sulphur, or suitable sulphur bearing material, mixed with charcoal or other carboniferous material. By this process, I have been enabled to produce a mixture of gases consisting largely of hydrogen sulphide carrying a considerable percentage of carbon dioxide, and usually some free hydrogen. This mixture of gases has been found to be very effective in modifying an oxidized ore to make it amenable to froth-flotation processes. It has also been found advantageous to agitate the pulp concurrently with passing the gas into the pulp and to agitate the pulp after sufficient of the gas has been passed into it for the purpose of expelling free gas before separating the froth. Moreover, I have found that the effectiveness of the gases in modifying the ore is increased if the gases generated are brought into the presence of lime or limestone, or similar material, advantageously heated to somewhere near a low red heat, before being used for treating the ore.

I have found that ores which have been difficult to treat by froth flotation by reason of the presence of a clay-like material can be so modified by a few minutes' treatment with the mixed gases described above, that they will be readily amenable to froth-flotation treatment. I have found this to be true even when considerable amounts of hydrated oxides of iron were present.

Bringing the gases into the presence of the lime material appears to be advantageous in several ways. Especially is it effective in eliminating the sulphur vapor which has hitherto proved troublesome in using hydrogen sulphide generated by the action of steam on heated sulphide ore. Apparently in the presence of steam and carbon dioxide the sulphur vapor reacts with the lime material to produce hydrogen sulphide. Moreover the presence of a notable amount of free hydrogen in the mixed gases appears to prevent the formation of carbon bisulphide and sulphur carbonyl or at least to prevent these substances from acting deleteriously on the ore. The lime material, or the hydrogen, or both, seem to eliminate the hydrogen persulphide. Thus the present invention provides a method of preparing a hydrogen sulphide gas free from deleterious substances.

In the accompaning drawings are shown, diagrammatically, apparatus suitable for carrying out the process of my invention.

Figure 1 is a sectional side view diagrammatically showing a gas producer and a froth-flotation machine as utilized by me.

Figure 2 is a sectional side view of a modified apparatus suitable for carrying out my invention with modified procedure.

Figure 3 is an end view of the apparatus shown in Figure 2 along the section line 3—3.

In the procedure as carried on in the apparatus shown in Figure 1, steam is generated in a boiler 1 and conveyed by a pipe 2 having a valve 3 so that the steam is conveyed to the bottom of a retort 4 within which is piled a mixture of sulphur-bearing material, such as sulphide copper ore, preferably crushed to pea size and free from dust. The material retained on a twenty mesh sieve (Tyler standard) has been found very satisfactory. With this crushed ore was mixed rather less than 20% of its weight of charcoal or other carboniferous material in pieces of approximately the same size; the mixture being supported by a wire netting 5 laid across the bottom of the retort to prevent the pipe 2 from being blocked.

Above this mixture is placed a second wire netting 6, and above the netting 6 a layer of lime, or limestone, or residual lime from a previous run, this lime material amounting to about 10% of the total charge below the wire netting 6. It has been found that these various forms of lime are almost equally efficient for the purpose which will be described more in detail later on. When the retort is thus filled, its top 7 is bolted down by bolts 8 passing through flanges 9 of a usual form. A pipe 10 through the top 7 conveys away the gases produced. It has been found advisable to have the total content of sulphur in the mixture beneath the netting 6 less than 30% of the mixture. If the sulphur-bearing material described above produces a mixture of greater sulphur content, it has been found advisable to mix inert material therewith, such as quartz or gangue.

The retort 4 is externally heated and to this end is shown as standing within an open topped furnace 11, with charcoal packed around the retort between the retort and the walls of the furnace 11. The furnace is preferably started by igniting the charcoal at the top and the steam turned on by opening valve 3. The steam is preferably carried through a short section 12 of the pipe 2 within the furnace and to some extent subjected to the heat thereof with superheating action. I have found in the use of this apparatus that the retort produced the best gas when heated by the furnace 11 so that its temperature varied from about 400 C. at the bottom near the netting 5, to about 700 C. at the top near the netting 6, the fire having been controlled by vents 13 of a kind usually found in such furnaces.

The effluent gases carried through the pipe 10 when made in this way consisted mainly of hydrogen sulphide but also contained carbon dioxide, hydrogen and free steam. A little sulphur vapor accompanied the gases.

In the apparatus as shown in Fig. 1, the gases are led through the pipe 10 to the bottom of a wash bottle, shown diagrammatically at 14, containing water, and from that to a second wash bottle, shown diagrammatically at 15, and thence by a pipe 16 to a gasometer or temporary holder 17. From the holder 17 the gases are led by a pipe 18 to treat a thick ore pulp usually made up 1 to 1 with water and with the ore ground to about 100 mesh (Tyler standard). The flow of the gases through the pipe 18 is controlled by a cock or valve diagrammatically shown at 19 so that the gases are admitted at will at the bottom of an agitating vessel 20 shown as the agitating compartment of a testing machine such as is shown in Figure 3 of Patent No. 1,203,372 to F. J. Lyster dated October 31, 1916. This machine includes an overhung agitator 21 of a usual type, diagrammatically shown as driven by a belt 22. When the gases are admitted to it, the pulp is held within the agitating vessel by the closure of the usual passages (not shown) connecting the agitating vessel and the spitzkasten. The pulp in the agitating vessel is treated by the gases for a sufficient time while the agitator 21 is run slowly. The gases are then turned off and the passage connecting the agitating chamber and the spitzkasten 23 are opened, water being added to the pulp to thin it for flotation. The addition of the flotation agents will be hereinafter described.

Apparently the excess steam or hydrogen controls the reaction by breaking up any sulphur carbonyl formed. Moreover, under the conditions of working, the presence of substances like hydrogen persulphide was inhibited.

In one test of the oxidized copper ore of the Huchang Mining Company of Korea, this ore included a gangue consisting of reddish brown clay interspersed with bunches of altered and partly altered ore, the clay material consisting of hydrated silicates of alumina, calcium carbonate and quartz, heavily impregnated with hydrated oxides and basic sulphates of iron. The copper was present in both sulphide and oxidized form. The latter occurred mostly as malachite and azurite with some cuprite and sometimes a little native copper. Chalcopyrite, tarnished and corroded, was present in the less oxidized lump portions.

This oxidized ore, containing about 1% copper as sulphide and 1½% oxidized copper, ground to pass a hundred mesh screen (Tyler standard), was treated in the agitation chamber of the flotation machine above described in a one to one pulp with the gases above described. The gases in this case were made from clean granular (peasized) iron pyrites mixed with 17% of charcoal, and covered with a layer amounting to about 10% of lime. The lime was partly calcium sulphide, being material recovered from a previous test. The retort containing the pyrites, charcoal and lime material was heated to 700° C. as a maximum. The gases were introduced as above described while the agitator was running at slow speed, until the copper carbonates showed distinctly sulphidized surfaces under the microscope. Meantime, two pounds of coal tar per ton of ore was added and thoroughly mixed. When enough gas had been passed into the pulp, the gas was shut off, and the thick pulp agitated until the free gas was expelled. Then the passages to the spitzkasten were opened and water was added to make a four to one pulp. Then sodium silicate was added at the rate of 4 pounds per ton of ore and white camphor oil at the rate of 0.5 lb. per ton of ore, vigorous agitation was begun, and some froth removed. To add stability to the froth, sodium resinate was added at the rate of 0.3 lb. per ton and the remainder of the froth removed. When the concentrate contained in these froths was recleaned, it assayed 10% copper, recovering 84% of the total copper. The small amounts of gold and silver present in the ore were very effectively concentrated with the copper.

I have found that a horizontal retort such as shown in Figure 2 may be substituted for the vertical retort shown in Figure 1. For simplicity of construction, the line material, the charcoal, and the sulphur bearing material may be heated together by mixing them in the horizontal retort barrel 25 which is mounted to rotate on standards 26 within a furnace 27 in which it is heated to a temperature of 400 to 700 C. by a fire, diagrammatically shown as gas flames 28.

In this furnace, I found it possible to use, without previous briquetting, ore concentrates containing copper sulphide. These, together with the proper amount of charcoal and lime material, were placed in the body of a retort 25 and then a cover 29 was bolted on and a steam pipe 30 inserted through the gland 31 to carry steam to the far end of the retort at 32. The mixture filled less than half the body of the retort 25, thus avoiding the liability of blocking the opening 33, through which the pipe 30 extended. A crank handle 34 was provided for turning the retort. Steam was admitted to the pipe 30 from a steam main 35, carrying superheated steam. The effluent gases were carried off to a wash bottle or bottles and a gasometer by a pipe 36, corresponding to the pipe 10 of Figure 1. By proper control of conditions of temperature and proportions and character of ingredients, it was found that mixing the lime material with the sulphide-carbon charge, in the manner described for the apparatus of Figure 2, had no deleterious effect on the gases. One objection however was that the lime could not easily be recovered for use in a second gas-making operation. Moreover when concentrates are used as a source of sulphur, the addition of lime dilutes them, adding to the cost of transporting them to a smelter.

If it is desired to increase the carbon dioxide content of my mixed gases the proportion of carboniferous matter may be increased. To obtain increased carbon dioxide without correspondingly increasing the hydrogen content of the mixed gases, air under pressure may be admitted to the retort, as by a valved pipe 37 connected to the steam pipe 2. An objection to introducing air is sometimes found in the fact that the nitrogen of the air dilutes the gases and requires bulkier apparatus.

The amounts of reagents set forth above are examples only and are subject to change to suit the needs of varying working conditions and of different ores. So also the working conditions will be adjusted to different ores. As is well known in the art the exact working conditions for best results to the treatment of any ore can only be determined in practice.

I claim:

1. A process of concentrating ores which consists in treating an ore pulp containing nonfloatable metalliferous particles with a gaseous mixture including a substantial percentage of both hydrogen sulphide and carbon dioxide so as to render floatable said originally non-floatable metalliferous particles, and subjecting the treated ore pulp to froth-flotation concentration.

2. A process of concentrating ores which consists in generating a mixed gas by passing steam through a suitably heated mixture including sulphur-bearing material and carboniferous matter to produce a mixed gas including a substantial percentage of both hydrogen sulphide and carbon dioxide, treating an ore pulp containing non-floatable metalliferous particles with said mixed gas so as to render floatable said originally non-floatable metalliferous particles, and subjecting the treated ore pulp to froth-flotation concentration.

3. A process of concentrating ores which consists in treating an ore pulp containing non-floatable metalliferous particles with a gaseous mixture including substantial percentages of hydrogen sulphide, carbon dioxide and hydrogen, so as to render floatable said originally non-floatable metalliferous particles and subjecting the treated ore pulp to froth-flotation concentration.

4. A process of concentrating ores which consists in generating a suitably heated mixed gas by passing steam through a mixture including sulphur-bearing material and carboniferous matter to produce a mixed gas including substantial percentages of hydrogen sulphide, carbon dioxide and hydrogen, treating an ore pulp containing non-floatable metalliferous particles with said mixed gas so as to render floatable said originally non-floatable metalliferous particles, and subjecting the treated ore pulp to froth-flotation concentration.

5. A process of concentrating ores which consists in generating a mixed gas by passing steam through a suitably heated mixture including sulphur-bearing material and charcoal to produce a mixed gas including substantial percentages of hydrogen sulphide, carbon dioxide and hydrogen, treating an ore pulp containing non-floatable metalliferous particles with said mixed gas so as to render floatable said originally non-floatable metalliferous particles, and subjecting the treated ore pulp to froth flotation concentration.

6. A process of concentrating ores which consists in passing into a thick ore pulp containing non-floatable metalliferous particles a gaseous mixture including a substantial percentage of both hydrogen sulphide nd carbon dioxide, to sulphidize said originally non-floatable metalliferous particles in the ore and render them floatable and subjecting the treated ore pulp to froth-flotation concentration.

7. A process of concentrating ores which consists in generating a mixed gas by passing steam and air through a suitably heated mixture including sulphur-bearing material and carboniferous matter to produce a mixed gas including substantial percentage of both hydrogen sulphide and carbon dioxide, treating an ore pulp containing non-floatable metalliferous particles with said mixed gas so as to render floatable said originally non-floatable metalliferous particles, and subjecting the treated ore pulp to froth-flotation concentration.

8. A process of concentrating ores which consists in generating a mixed gas by passing steam and air through a suitably heated mixture including sulphur-bearing material and carboniferous matter to produce a mixed gas including substantial percentages of hydrogen sulphide, carbon dioxide and hydrogen, treating an ore pulp containing non-floatable metalliferous particles with said mixed gas so as to render floatable said originally non-floatable metalliferous particles, and subjecting the treated ore pulp to froth-flotation concentration.

9. A process of concentrating ores which consists in treating an ore pulp containing non-floatable metalliferous particles with a soluble sulphide in the presence of substantial percentages of carbon dioxide and hydrogen so as to render floatable said originally non-floatable metalliferous particles, and subjecting the treated ore pulp to froth-flotation concentration.

10. A process of concentrating ores which consists in generating a mixed gas by passing steam through a suitably heated mixture including a sulphide and charcoal to produce a mixed gas including a substantial percentage of both hydrogen sulphide and carbon dioxide, treating an ore pulp containing non-floatable metalliferous particles with said mixed gas so as to render floatable said originally non-floatable metalliferous particles, and subjecting the treated ore pulp to froth-flotation concentration.

11. A process of concentrating ores which consists in treating an ore pulp containing non-floatable metalliferous particles with sufficient soluble sulphide to visibly sulphidize oxidized ore and a substantial percentage of carbon dioxide to render floatable said originally non-floatable metalliferous particles, and subjecting the treated ore pulp to froth-flotation concentration.

12. A process of concentrating ores which consists in generating a mixed gas by passing steam and air through a suitably heated mixture including a sulphide and charcoal to produce a mixed gas including substantial percentages of both hydrogen sulphide and carbon dioxide, treating an ore pulp containing non-floatable metalliferous particles with said mixed gas so as to render floatable said originally non-floatable metalliferous particles, and subjecting the treated ore pulp to froth-flotation concentration.

13. A process of concentrating ores which consists in generating a mixed gas by passing steam through a suitably heated mixture including sulphur-bearing material and carboniferous material to produce a mixed gas including hydrogen sulphide and carbon dioxide, bringing the mixed gas into contact with a suitably heated lime material, treating an ore pulp with the mixed gas, and subjecting the treated ore pulp to froth-flotation concentration.

14. A process of concentrating ores which consists in generating a mixed gas by passing steam through a suitably heated mixture including a sulphide and charcoal to produce a mixed gas including hydrogen sulphide and carbon dioxide, bringing the mixed gas into contact with a suitably heated lime material, treating an ore pulp with the mixed gas and subjecting the treated ore pulp to froth-flotation concentration.

15. A process of concentrating ores which consists in generating a mixed gas by passing steam and air through a suitably heated mixture including sulphur-bearing material and carboniferous material to produce a mixed gas including hydrogen sulphide and carbon dioxide, bringing the mixed gas into contact with a suitably heated lime material, treating an ore with the mixed gas, adding water to the ore to make a pulp suitable for froth flotation, and subjecting the ore pulp to froth-flotation concentration.

16. A process of concentrating ores which consists in generating a mixed gas by passing steam through a suitably heated mixture including sulphur-bearing material and carboniferous material to produce a mixed gas including hydrogen sulphide and carbon dioxide, bringing the mixed gas into contact with a suitably heated lime material, treating an ore with the mixed gas, adding water to the treated ore to make a pulp suitable for froth flotation, and subjecting the ore pulp to froth-flotation concentration.

17. A process of concentrating ores which consists in generating a mixed gas by passing steam through a suitably heated mixture including sulphur-bearing material and carboniferous material and bringing the gaseous product carrying steam into contact with a suitably heated lime material, treating an ore pulp with the mixed gas, and subjecting the treated ore pulp to froth-flotation concentration.

18. A process of concentrating ores which consists in generating a mixed gas by passing steam through a suitably heated mixture including a sulphide and charcoal and bringing the gaseous product carrying steam into contact with a suitably heated lime material, treating an ore pulp with the mixed gas, and subjecting the treated ore pulp to froth-flotation concentration.

19. A process of concentrating ores which consists in generating a mixed gas by passing steam through a suitably heated mixture including sulphur-bearing material and carboniferous material and bringing the gaseous product carrying steam into contact with a suitably heated lime material, treating an ore with the mixed gas, adding water to the ore to make a pulp suitable for froth flotation, and subjecting the treated ore pulp to froth-flotation concentration.

20. A process of concentrating ores which consists in generating a mixed gas by passing steam and air through a suitably heated mixture including sulphur-bearing material and carboniferous material and bringing the gaseous product carrying steam into contact with a suitably heated lime material, treating an ore with the mixed gas, adding water to the ore to make a pulp suitable for froth flotation, and subjecting the treated ore pulp to froth-flotation concentration.

In testimony whereof I have affixed my signature to this specification.

HAROLD HARDY SMITH.